United States Patent [19]
Rutzke

[11] Patent Number: 6,122,050
[45] Date of Patent: Sep. 19, 2000

[54] OPTICAL INTERFACE FOR A RADIALLY VIEWED INDUCTIVELY COUPLED ARGON PLASMA-OPTICAL EMISSION SPECTROMETER

[75] Inventor: Michael A. Rutzke, Brooktondale, N.Y.

[73] Assignee: Cornell Research Foundation, Inc., Ithaca, N.Y.

[21] Appl. No.: 09/032,652

[22] Filed: Feb. 26, 1998

[51] Int. Cl.[7] .................................................. G01J 3/30
[52] U.S. Cl. ............................................................ 356/316
[58] Field of Search ....................... 356/316; 219/121.36; 250/288

[56] References Cited

U.S. PATENT DOCUMENTS

| | | | |
|---|---|---|---|
| 4,871,580 | 10/1989 | Schram et al. | 427/38 |
| 4,902,099 | 2/1990 | Okamoto et al. | 356/316 |
| 4,955,717 | 9/1990 | Henderson | 356/316 |
| 4,999,492 | 3/1991 | Nakagawa | 250/288 |
| 5,298,743 | 3/1994 | Kato | 250/288 |
| 5,383,019 | 1/1995 | Farrell et al. | 356/316 |
| 5,436,723 | 7/1995 | Kunselman et al. | 356/316 |
| 5,495,107 | 2/1996 | Hu et al. | 356/316 |
| 5,506,149 | 4/1996 | Crawford et al. | 356/316 |
| 5,534,998 | 7/1996 | Eastgate et al. | 356/316 |
| 5,565,679 | 10/1996 | Tanner et al. | 250/288 |
| 5,642,190 | 6/1997 | Krupa et al. | 356/316 |
| 5,841,531 | 11/1998 | Gliddon | 356/316 |

OTHER PUBLICATIONS

Faires, L. et al, 1985, "Top–Down" Versus "Side–On" Viewing of the Inductively Coupled Plasma, Appl. Spectroscopy, vol. 39, No. 1, pp 5–9.

Montaser, A. et al, 1982, Atomic Emission Spectrometry with a Skimmed Inductively Coupled AR Plasma, Appl. Spectroscope, vol. 36, No. 4, pp 454–459.

Demers, D., 1979, "Evaluation of the Axially Viewed (End–on) Inductively Coupled Argon Plasma Source for Atomic Emission Spectroscopy", Appl. Spectroscopy, Vo 33, No. 6, pp 584–591.

Blades, M. et al, 1980, "Photodiode Array Measurement System for Implementing Abel Inversions on Emission from an Inductively Coupled Plasma" Appl. Spectroscopy, vol. 34, No: 6, pp 696–69.

Ivaldi, J. et al, 1996, "Real–time internal standardization with an axially–viewed inductively coupled plasma for optical emission spectrometry", Spectrochimica Acta Part B 51, pp 1443–1450.

Cleland, T. et al, 1996, "Statistical mechanics of $Ar_2$ in an inductively coupled plasma", Spectrochimica Acta Part B 51, pp 1487–1490.

(List continued on next page.)

*Primary Examiner*—Frank G. Font
*Assistant Examiner*—Zandra Smith
*Attorney, Agent, or Firm*—Brown, Pinnisi & Michaels, P.C.

[57] ABSTRACT

The device disclosed herein is useful in the development of a new plasma spectrometer with enhanced sensitivity. An alteration in the configuration of the optic lenses used in conjunction with a water-cooled disc allows for the use of a short depth of focus to more reliably sample a given analyte. The collimating lens used in this invention can be placed within 4 millimeters of the load coil, including in the tip of the axial plasma generated by the RF generator. When used with in conjunction with a high-efficiency nebulizer to more precisely control the size of the sample droplets present in the base of the plasma further reduces the matrix effects seen in other spectrometers, while enhancing sensitivity. The optics configuration disclosed in the instant invention allows for the retrofitting of a conventional radially-viewed plasma spectrometer into a more sensitive axially-viewed spectrometer. The optics configuration can also be used to either enhance the sensitivity of existing spectrometers, or as a substitute for new ICP-OES systems to reduce their matrix effects as well. The typical spectrometer for which this change in configuration would be most useful would be an inductively coupled argon plasma-optical emission spectrometer (ICP-OES), in which the analyte studied can be sectioned axially.

39 Claims, 5 Drawing Sheets

OTHER PUBLICATIONS

Davies, J. et al, 1985, "Axial View of an Inductively Coupled Plasma", Analyst, pp. 535–540.

M. W. Blades and M G. Horlik, 1981 1CP3 The Vertical Spatial Characteristics of Analyte Emission in the Inductively Coupled Plasma, Spectrochim. Acta, 3611, No. 9 pp. 861–880.

M. W. Blades and M G. Horlick, 1981 1CP 4 Interference From Easily Ionizable Element Matrices in Inductively Coupled Plasma Emission Spectrometry—A Spatial Study, 10 Spectrochimica Acta., 36B, No. 9 pp. 881–900.

M. W. Blades and C. B. L., 1985 1CP 18 Exitation Temperature and Electron Density m the Inductively Coupled Plasma–Aqueous vs. Organic Solvent Introduction, Spectrochim. Acta., 40B, No. 4 pp. 579–591.

P. W. J. M. Bournans, 1982 1CP 29 Comment on a Proposed Excitation Mechanism in is Argon 1CPs, Spectrochim. Acta., 3711 pp. 75–82.

B. L. Caughlin and B. M. W., 1984 1CP 36, An evaluation of Ion–Atom Emission Intensity Ratios and Local Thermodynamic equilibrium in an Inductively Coupled Plasma, Spectrochim. Acta., 39, No. 12 pp. 1583–1602.

B. L. Caughlin and M. W. Blades, 1985 ICP 37 Analyte Ionization in the Inductively 20 Coupled Plasma, Spectrochim. Acta., 40B, 10–12 pp. 1539–1554.

J. Davies and B.. D. Snook, 1986 1CP 24 Spatial Emission Characteristics and Excition Mechanisms in the Inductively Coupled Plasma, J. Anal. At. Spectrom., 1, Oct. 25 pp. 325–330.

C. Dubuisson,, E. Poussel and L.M. Mermet, 1997 1CP 31 Comparison of Axially and Radially Viewed Inductively Coupled Plasma Atomic Emission Spectrometry in Terms of Signal–to–Background Ratio and Matrix Effects, J. Anal. At. Spectrom., 12, Mar. pp. 281–286.

N. Furuta and C. Horlick, 1982 1CP 11 Spatial Characterization of Analyte Emission and Excitation Temperature in an Inductively Coupled Plasma, Spectrochim. Acta., 37B, No. 1 pp. 53–64.

P. J. Galley and C. M. Hieftje, 1994 ICP 19 Easily Ionizable Element (EIE) Interferences in Inductively Coupled Plasma Atomic Emission Spectrometry–11. Minimization of ME Effects By Choice of Observation Volume, Spectrochim Acta., 49B, No. 7 pp. 703–724.

W. H. Gunter, K. Visser and ZY.B., 1982 1CP 16 Some Aspects of Matrix Interference Caused by elements of Low Ionization Potential in Inductively Coupled Plasma Atomic Emission Spectrometry, Spectrochim. Acta., 3713, No. 7 pp. 571–581.

T. Hasegawa and H. Haraguchi, 1985 1CP 35 A Collisional–Radiative Model is Including Radiation Trapping and Transport Phenomenafor Diagnostics of an Inductively Coupled Argon Plasma, Spectrochim. Acta., 40B, 10–12 pp. 1505–1515.

G. M. Hiefte, G. D. Rayson and J. W. Olesik, 1985 1CP 10, A Steady–State Approach to Exitation Mechanism in the ICP, Spectrochim. Acta., 40B, Nos. 1/2 pp. 167–176.

G. M. Hiefte, 1996 ICP 22 The Future of Plasma Spectrochemical Instrumentation, J. Anal. At. Spectrom., 11, Sep. pp. 613–621.

G. Horlick and N. Foruta, 1982 1CP 8 Spectrographic Observation of the Emission Structure of the Inductively Coupled Plasma Spectrochimica Acta., 3 7B, No. 11 pp. 999–1008.

M. Huang and L. Keling, 1986 1CP 1 Decay of an Inductively Coupled Argon Plasma Above the Load Coil, J. Anal. At. Spectrom., 1, Apr. pp. 153 to 156.

E.B.M. Janseri and D. R. Demers, 1985 1CP 33 Hollow–Cathode Lamp–Excited Inductively Coupled Plasma Atomic–Fluorescence Spectrometry: Performance Under Compromise Conditions For Simultaneous Multi–Element Analysis, Analyst, 110, May, pp. 541–545.

T. C. Johnston, R. S. Perry, L. J. Fick and H. B. Fannin, 1997 1CP 32 An Examination 35 of Relative Trends of Atomic Detection Limits in the Inductively Coupled Plasma, Spectrochim. Acta., B 52, pp. 125–129.

B. R. LaFreniexe, D. R. Wiederin, V. A. Fassel and R. S. Houk, 1996 1CP 13 Molecular Hydrogen Emission in the Vacuum Ultraviolet From an Inductively Coupled Plasma, Spectrochimica Acta, 5 1B, pp. 3–12.

G. F. Larson, It. A. Fassel, R. H. Scott and R. N. Kniseley, 1975 1CP 9 Inductively 5 Coupled Plasma—Optical Emission Analytical Spectrometry: A Study of Some Inter–element Effects, Anal. Chem., 47, No. 2 pp. 23 8–243.

JM. Mermet and E. Poussel, 1995 1CP 21 1CP Emission Spectrometers: 1995 Analytical Figures of Merit, Appl. Spectrosc., 49, No. 10 pp. 12a–18a.

G. P. Miller, '1991 1CP 39 A Methodfor Observing Changes in Radiative Losses From and Inductively y Coupled Argon Plasma, Spectrochim. Acta., 4613, No. 9 pp. 1253–1262.

J. Mostaghimi, P. Proulx and M. 1. Boulos, 1985 1CP 12 Computer Modeling of the Emission Patterns for a Spectrochemical ICP, Spectrochim. Acta., 40B, Nos. 1/2 pp. 153–166.

Novonty, J. C. Farinas, W. Jia–ling, E. Poussel and J. M. Mermet, 1996 1CP 34 Effect Of Power and Carrier Gas Flow Rate on the Tolerance to Water Loading in Inductive4y Coupled Plasma Atomic Emission Spectrometty, Spectrochim. Acta., 20 51B, pp. 1517–1526.

K. O'Hanlon, L. Ebdon and M. Foulkes, 1997 1CP 26 Effect of Easily Ionisable Elements on the Mass Transport of Solutions and Slurries Used in Plasma Emission.5pectrometry, J. Anal. At. Spectrom., 12, Mar. pp. 329–331.

J. W. Olesik, J. A. Kinzer and B. Harkleroad, 1994 1CP 38 Inductively Coupled 25 Plasma Optical Emission Spectrometry Using Nebulizers with Widely Different Sample Consumption Rates, Anal. Chem., 66, No. 13, Jul. 1 pp. 2022–2030.

L. Paama, L. Piiri, P. Peramaki and L. H. Lajunen, 1995 1CP 20 Matrix Effects in Argon Plasma on Elemental Analysis of Archaeological Glazes by Inductively Coupled Plasma Atomic Emission Spectrometry, J. of Anal. Atom. Spectrom., 10, 30 Feb. pp. 117–119.

M. H. Ramsey and M. Thompson, 1986 1CP 2 A Predictive Model of Plasma Matrix Effects in Inductively Coupled Plasma Atomic Emission Spectrometry, J. Anal. At. Spectrom., 1, Jun., pp. 185–193.

N. N. Sesi and G. M. Hieftje, 1996 1CP 25 Studies into the Inter–element Matrix Effect in Inductively Coupled Plasma Spectrometry, Spectrochim. Acta., 5 IB, pp. 1601–1628.

M. Thompson and M.H. Ramsey, 1985 1CP 15 Matrix Effects Due to Calcium in Inductively Coupled Plasma Atomic–Emission Spectrometry: Their Nature, Source and Remedy, Analyst, 110, Dec. pp. 1413–1422.

M. Thompson, M. H. Ramsey, B. J. Coles and C. M. Du, 1987 1CP 27 Correction of Matrix Effects in Inductively Coupled Plasma Atomic Emission Spectrometty by Interactive Power Adjustment, J. Anal. At. Spectrom., 2, Mar. pp. 185–188.

M. Thompson and M. H. Ramsey, 1987 1CP 28 Self–matrix Effects as a Cause of Calibration in Inductively Coupled Plasma Atomic Emission Spectrometry, J. Anal. At. Spectrom., 2, Feb. pp. 33–38.

D. G. J. Weir and M. W. Blades, 1994 1CP 3 0 The Response of the Inductively Coupled Argon Plasma to Solvent Plasma Load: Spatially Resolved Maps of 15 Electron Density Obtained from the Intensity of One Argon Line, Spectrochim. Acta., 4911, 1214 pp. 1231–1250.

D.C. Schram, J.A. M. Vadermullen, J.M. Deregt, D.A. Benoy, F.H.A.G. Fey, F. De Grootte, and J. Jonkers, 1996 ICP 23, *Fundamental Description of Spectrochemical Inductively Coupled Plasmas*, Jnl of Analytical Atomic Spectrometry, 11, pp. 623–632.-

OPTICAL INTERFACE FOR A RADIALLY VIEWED INDUCTIVELY COUPLED ARGON PLASMA-OPTICAL EMISSION SPECTROMETER

FIELD OF THE INVENTION

The invention pertains to the field of spectrometers used for quantitative analysis. More particularly, the invention pertains to an apparatus, which converts a spectrometer from one in which the plasma is viewed radially to one in which plasma is viewed axially.

BACKGROUND OF THE INVENTION

Spectrometric analysis entails the precise measurement of the interaction between a sample (analyte) and an energy source in order to determine the chemical composition of the aforementioned analyte. Techniques of spectrometric analysis vary both in the state in which an analyte is placed prior to testing, and in the type of energy to which the analyte is exposed. However, all spectrometric techniques are based upon relating the energy-dependent behavior of an analyte to its constituent quantity and quality.

In emission spectrometry the analyte to be tested is supplied with energy from a non-radiative external energy source, usually heat from a plasma flame or electric wire. Upon exposure to an external energy source, the analyte gains energy, and typically re-emits this energy in the form of photons. The quantity and scatter distribution of these released photons is then measured by a light sensitive spectrometer, and used for quantitation, since the energy emission pattern of an analyte is specific for each constituent of that analyte. Thus, allowing a quantitative analysis of the elemental composition of that analyte to be made.

The Inductively Coupled Argon Plasma-Optical Emission Spectrometer (ICP-OES) is a species of plasma spectrometer that can quantitatively analyze various sample/analyte types to determine their elemental composition. Common sample sources include: water, plant and animal tissues, geological specimens and industrial samples. Plasma spectrometers use a radio frequency and a stream of argon in an open-ended quartz tube to generate plasma whose temperature can reach 10,000 degrees centigrade. The hot plasma created in this way is flame-like in appearance and is as hot as the surface of the sun. A stream of argon then carries an aerosol of the sample to be analyzed into the central channel of the plasma. As the sample encounters the hotter portion of the plasma its atoms go from their ground state to an excited state or, become ionizable, a situation in which some of the sample's electrons are stripped from outer valence shells. Eventually the electrons return to their ground states and during this change in energy status, they release a characteristic wavelength of light for each element present in the sample. It is this characteristic or signature spectra pattern of light, which is used to identify given elements.

In a conventional radially-viewed ICP-OES, the emitted light is viewed from the side of a vertically oriented plasma and focused on the entrance slit of the spectrometer. The spectrometer separates the emitted light by wavelength and measures the intensity of the generated light. In an axially-viewed ICP-OES, the plasma is tilted 90° degrees on its side, and the optical interface images the central channel of the plasma onto the entrance slit of the spectrometer for viewing. It is the central channel of the plasma that emits the light with the best signal-to-noise ratio, resulting in a ten to thirty fold improvement in sensitivity of measurement over its radially viewed counterpart.

However, current designs of axially viewed ICP-OES are prone to matrix interference because the entrance optics are designed with a long depth of field. As a result the entire axial channel of the plasma, including its tip and base is imaged onto the entrance slit of the spectrometer through the use of long focal length lenses or mirrors. This generally causes a 10–15% loss of recovery of some elements in a 1000 ppm (parts per million) calcium matrix. In addition, the cost of a new axially viewed spectrometer is considerably higher than converting a radially-viewed spectrometer to an axially-viewed spectrometer. This economic factor often limits who can purchase and use axially-viewed spectrometers. The invention disclosed herein is designed to alleviate the aforementioned problems by providing a device that can be integrated into a new spectrometer entirely or the optical interface can comprise an apparatus with the capability to be reversibly attached to an existing spectrometer. In either case the optical configuration disclosed herein will reduce the matrix effects that occur in both radial and axially-viewed spectrometers.

SUMMARY OF THE INVENTION

The apparatus disclosed herein is a retrofit device that converts a conventional radially-viewed ICP-OES into a more sensitive axially-viewed ICP-OES. The optics configuration disclosed herein, along with the use of a high-efficiency, pneumatic, nebulizer can also be used as the basis for a new ICP-OES instrument with enhanced detection limits and reduced matrix effects relative to existing axially viewed ICP-OES systems.

The invention described herein is comprised of a cooling device housing a collimating lens, such that the lens can be placed in, or very near, the tip of the axial plasma viewed by the spectrometer. The short field of focus made possible through this optical configuration will allow a better sampling of emission spectra and reduce the matrix interference effects. This lens, in combination with a focusing lens makes it possible to optically section the plasma more precisely. As a result of this optical interface, the best viewing region of the plasma channel can be accurately imaged onto the entrance slit of the spectrometer with this optical interface.

This lens closest to the tip of the plasma is protected by a water-cooled disc within a poly-tetrafluorethylene cylinder to cool it and maintain its integrity. The cylinder is exhausted to vent away the hot gasses generated by the plasma. In addition, this cylinder and the fifty-millimeter collimating lens it protects have argon gas, air, or an inert gas continuously drawn over them. With the removal of these hot gasses and the cooling of the collimating lens, the lens can be placed within four centimeters of the load coil.

The optical interface described herein is an improvement over commercially available optical interfaces on existing instruments, in that it will reduce matrix interference. Another improvement disclosed herein that will enhance instrument detection limits is the use of a high-efficiency, pneumatic, nebulizer that more efficiently standardizes analyte droplet sizes contained in the aerosols sampled by the plasma spectrometer. This increased efficiency is realized from increased transport efficiency of analyte, and enhanced responsivity (analyte emission intensity/amount of analyte entering the plasma). With increased responsivity a smaller volume of analyte is sufficient for testing, decreasing risk when hazardous materials are involved, allowing smaller sample sizes to be used for rare or costly materials, and making instrument cleanup less cumbersome or time-consuming.

DETAILED DESCRIPTION OF THE INVENTION

Figure 1:
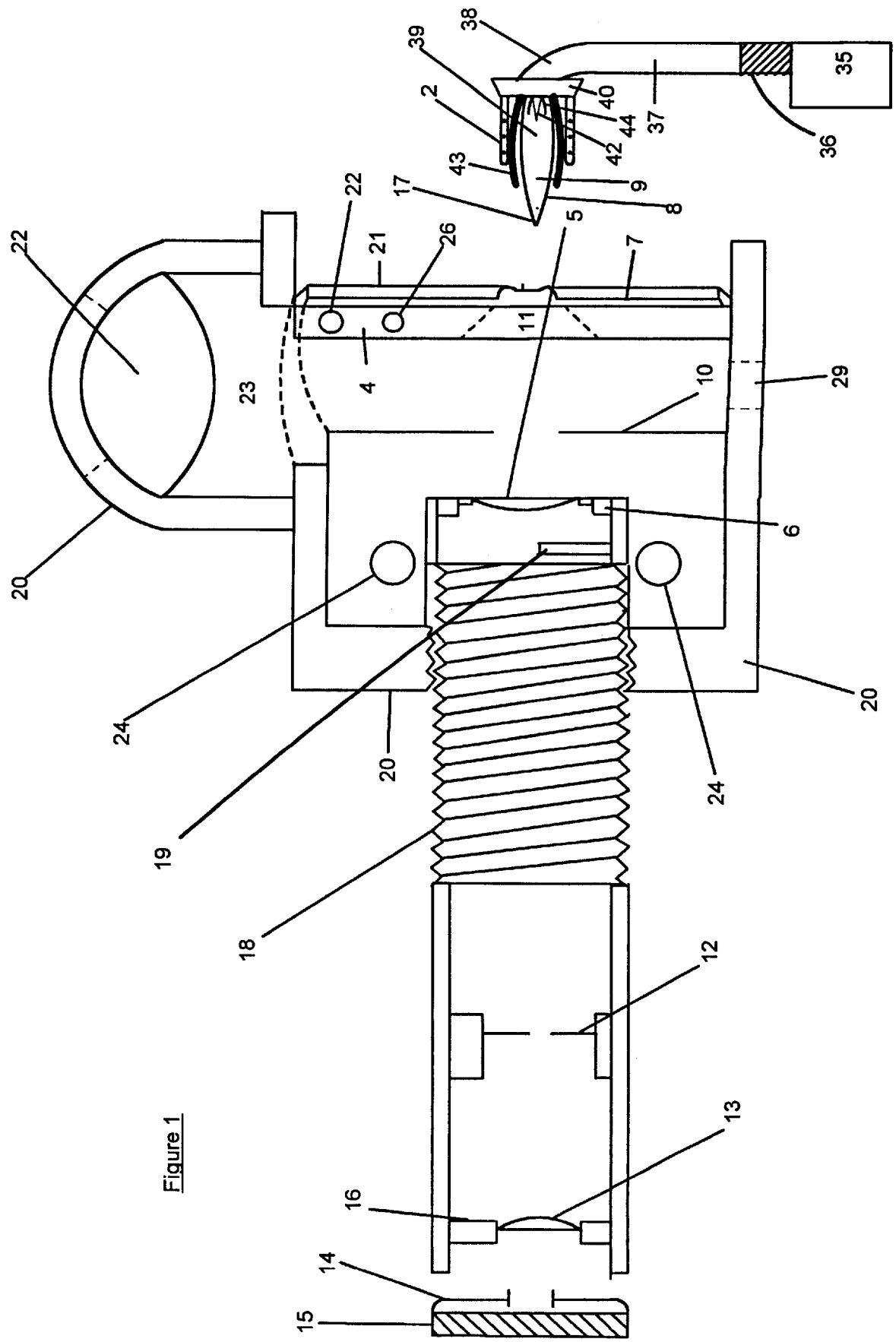
FIG. 1 shows a lateral cutaway view of the optical configuration used in this invention. The figure includes reference numerals to all key components, including the collimating lens the cooling apparatus, and pneumatic nebulizer.

Referring now to FIG. 1, the plasma emission spectrometer described herein comprises a plasma ion source 1 having electromagnetic excitation means comprising induction or load coils 2 associated therewith. Power for plasma generation is typically provided by an alternating radio-frequency (RF) power generator 3. Generator 3 provides RF power to induction coils 2 sufficient to excite a gas into a plasma 8. Spectral emissions from plasma 8 are first sampled by a first optics lens 5 held by a lens holder 6. Water-cooled skimmer 7 is located between said first optics lens 5 and plasma 8. The light radiation to be detected by lens 5 is within the range of infrared, visible and ultraviolet electromagnetic radiation.

The emission spectra sampled by optics lens 5 is emitted from the long axis of central plasma channel 9. After emission the electromagnetic radiation to be sampled passes through a 1.0 cm location 11 in the center of skimmer 7. The emission then passes through partitioning aperture 10. After passing through skimmer 7 the emission spectra enters lens 5 at which point it is collimated into a parallel beam and travels through a partitioning aperture 12 to a second optics lens 13 and is focused onto the entrance slit 14 of spectrometer signal quanitation means 15 where the emission spectra are resolved.

Optics lens 13 is held by a lens holder 16. The advantage that this design has over other optical interfaces is that said first optics lens 5 is placed very close to the tip 17 of the central plasma channel 9. (Table 1). The typical distance for this placement of lens 5 is within 2 to 10 centimeters of the plasma tip 17, which can be altered by the use of adjustment means 18. This adjustment means when used to put the optical interface closer relative to plasma 8, allows the collection of more light with a shorter depth-of-field from the central plasma channel 9 to enter the spectrometer for analysis, improving spatial resolution. The spatial resolution within the plasma 8 can be further improved if a photon stop 19 is placed behind said first optic lens 5 and if said second optic lens 13 is repositioned closer to first optic lens 5. This design blocks out nearly all parallel light from the base of the plasma 8 that otherwise might be sampled. As a result, the emissions that cause the matrix effects seen in a conventional axial or radial spectrometers are either defocused or are blocked by the photon stop 19 and do not pass through the entrance slit 14 into the spectrometer for signal resolution and quanitation.

Skimmer 7 is housed in a cylindrical tube 20, said cylindrical tube having an outer heat resistant coating, typically of poly-tetrafluoroethylene. Skimmer 7 is further comprised by exhaust port 22 that vents away hot gasses generated from the stream of plasma 8. Here the hot gasses from said plasma 8 or inert gas vents 24, or air vent 29 mix, and are sucked into vent tube 23 and vented out through exhaust port 22. Any hot gasses generated by the proximity of plasma 8 are then drawn up into the exhaust port 22. In addition, to cool first optic lens 5 an inert gas is continually drawn over lens 5 through vent ports 24 and exhausted through aperture 10 to exhaust port 22. Said inert gas is typically argon gas and/or nitrogen gas. This gas stream ensures that none of the hot gasses from plasma 8 is causes damage to lens 5.

Figure 2:
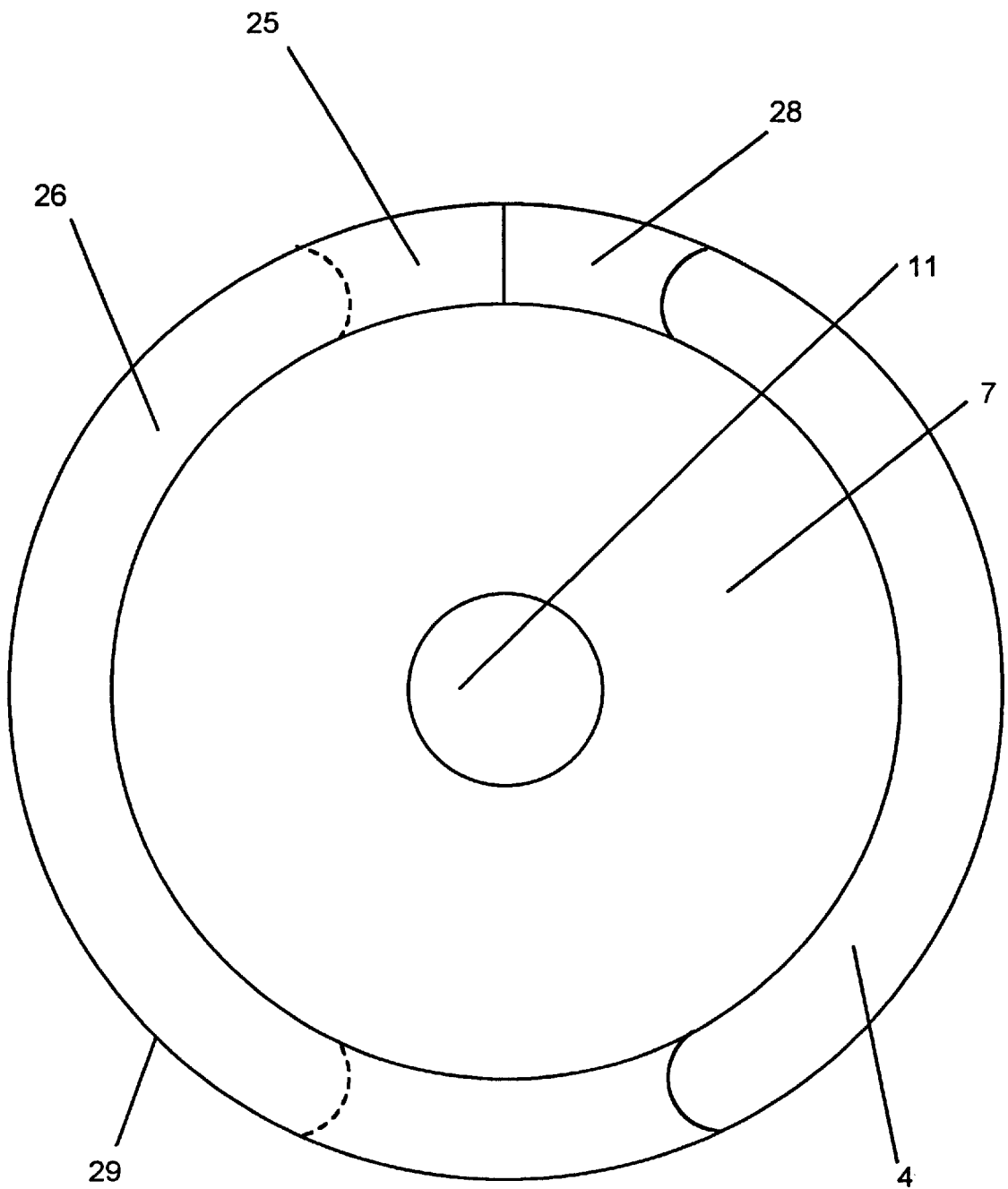
FIG. 2 shows a cross section of a skimmer portion of the adapter.

Referring now to FIG. 2, skimmer 7 is a disc, typically made of brass or other heat conductive material, whose surface closest to plasma 8 is coated with an outer protective layer 21. Outer protective layer 21 is comprised of nickel or other corrosive resistant material that can withstand the direct contact of plasma 8. Skimmer 7 is further comprised by a hollow core containing a coolant inlet 25 which has a coolant channel 26 so that a coolant, typically water, may be continually drawn from a coolant source 27 through said coolant channel 26 and out fluid outlet 28 to draw heat away from skimmer 7 and thereby away from an outer protective layer 21. To allow said inert gas to be drawn over lens 5 and be exhausted through exhaust port 22, skimmer 7 has air vents 4. Skimmer 7 also has a rim 28 that is used to keep cylindrical tube 20 from being deformed by the hot gasses created by plasma 8 and exhausted through exhaust port 22.

A carrier gas 34 such as argon or nitrogen is supplied from reservoir 35 into passage 36 and flows through tube 37 before reaching location 38, to remove local turbulence in the flow of carrier gas. The flow of said carrier gas 34 is laminar and carriers the analyte droplets 39 generated by high-efficiency nebulizer 40. The velocity of the laminar flow of said carrier gas 34 should be approximately that of the droplets 39 so that the droplets do not create a significant wake as they flow down tube 37 toward the plasma 8. Droplets 39 are thereafter injected into a conventional plasma device 41. As is conventional, tube 37 narrows at injector 42 to accelerate the flow of carrier gas 34 into plasma 8. Conventional plasma device 41 further comprises quartz walls 43 inside load coils 2. Inside of these quartz walls 43 is inner tube 44, which in turn lies outside of injector 42.

As is known, plasma 8 supplies sufficient energy to atomize any analyte in the carrier gas 34. After atomization, the analyte droplets in the plasma reach an excited energy state. When the electrons of these same atoms again reach ground state they release a signature wavelength of light. It is this light, or emission spectra, which is sampled and quantified by the spectrometer.

PREFERRED EMBODIMENT

When a uniform train of droplets is injected into a stream of carrier gas 34 instability of the resulting droplet stream may occur, which may manifest by irregularities of drop spacing, and by lateral movement of the drops themselves. These irregularities in movement result from two general causes, mainly turbulence within the gas flow, and interference in the laminar flow of droplets created by a wake effect of previously injected droplets. Since it is preferred to inject a consistent stream of particles into the plasma channel, any such irregularities and movement should be minimized. Therefore, the conveying gas steam should be laminar and steady. To avoid wake interactions drop spacing should be sufficient to insure that generated wakes will not affect adjacent drops. Of the drop velocity vector and the gas velocity vector are identical, then there will be no wakes, and the drops can be very close together. The mismatch in velocity usually exists only during the transient phase immediately after injection of the droplets into the carrier gas stream. The droplets will slow down or speed up until their velocity vector matches that of the carrier gas. Therefore a combination of drop diameter, drop frequency, droplet injection velocity vectors, and gas velocity should be optimized to generate the desired consistency of sample into the plasma stream. In the instant invention a high-efficiency nebulizer is utilized to standardize and reduce the size of injected droplets, and to regulate drop frequency. Gas velocity is also controlled to maintain laminar flow.

In a preferred embodiment said first optics lens 5 is a fifty-millimeter (50-mm) plano-convex collimating lens with its flat surface facing the plasma, and said second optics lens 13 is a two hundred fifty-millimeter (250-mm) plano-convex focusing lens that when in use has its flat surface facing the entrance slit of the spectrometer. A 250-mm focusing lens, or a combination of a 50-mm diverging lens 33 with a 75-mm focusing lens 32 may be used as an alternative optical interface.

In a preferred embodiment the outer protective layer 21 of skimmer 7 is covered with a layer of heat and chemically resistant material such as nickel while skimmer 7 is made of a heat resistant material such as brass. Cylindrical tube 20, typically covered by a heat resistant material such as polytetrafluorethylene, is deflect or resist heat from plasma 8. Also in a preferred embodiment photon stop 19 is placed six millimeters behind first optics lens 5.

In an alternative embodiment, different methods of introducing an analyte into the plasma may be used within the scope of the invention. Instead of using a high efficiency nebulizer an ultrasonic nebulizer can be used. Alternatively electrothermal vaporization or laser ablation are also effective with the optical interface described herein.
ICP-OES The type of spectrometer upon which the invention disclosed herein was developed was an Inductively Coupled Argon Plasma-Optical Emission Spectrometer (ICP-OES). The prototype device was able to reduce most of the matrix effects typically seen in traditional axially viewed ICP-OES's while maintaining similar or more sensitive detection limits (Tables 1 and 2). A further advantage of this retrofittable adapter is its flexibility in adapting it to customers sampling needs. Optically sectioning the plasma allows the operator to make adjustments so as to reduce matrix effects, optimize detection limits, or select a compromise setting between the two extremes. As a result, the best sampling region of the plasma channel can be imaged onto the entrance slit of the spectrometer.

It should be noted that the configuration changes described do not have as their purpose an effort to find the best focus, but to sample the plasma spectra in a way that maximizes sensitivity and/or accuracy. This enhanced accuracy was achieved through the movement of the collimating lens to within 3 centimeters or closer of the plasma flame, and sectioning it axially. To maintain the integrity of this lens so close to the temperatures generated by a plasma spectrometer, this inventions incorporates the use of a water-cooled disc with a hollow core that is comprised of a heat conductive material such as brass and has an outer layer 21, which protects it from the direct heat of plasma 8. This skimmer 7 is housed within a cylindrical tube 20 that itself is coated with a heat resistant layer. The covering for the skimmer's outer protective layer 21 is generally nickel though other heat resistant materials can be used. The cylinder 20 is exhausted through tube 19 to vent away the hot gasses, including those from the tip of the plasma 8. The removal of these hot gasses and the cooling of the fifty-millimeter collimating lens with argon gas or air allow the lens, placed within three centimeters of the central channel of the plasma, to maintain its integrity. The optical configuration described herein will also improve the detection limits in atomic fluorescence, by viewing the axial channel in the plasma where the emitted light from the sample is more concentrated and by avoiding the high background light emitted from the plasma envelope.

Figure 3:
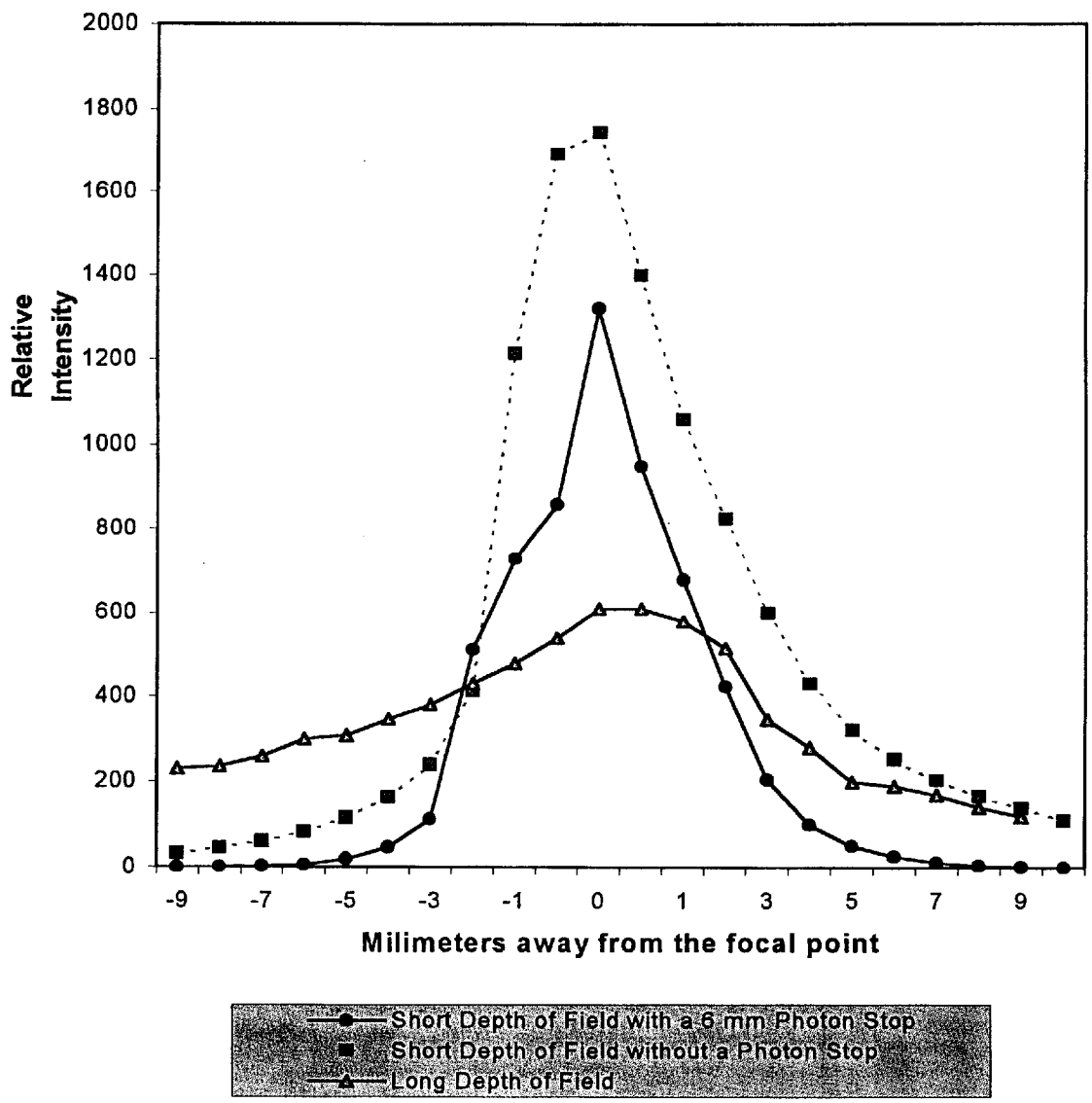
FIG. 3 shows a graphic representation of the effect that the optical interface's short depth of field configuration has on the emission spectra of a given sample. The sensitivity of current invention is compared to that of other spectrometers, typically those with a long depth of field.

The invention disclosed herein, with the addition of a 6 mm photon stop behind the first optic lens can optically section the axis of a plasma with fine enough resolution that it can be used to study some to the plasma's fundamentals properties. For example, FIG. 3 compares the effect the optical interface's depth of field has on the pattern of light that is imaged onto the entrance slit of a spectrometer when using a pinpoint light source. An optical interface that uses a short depth of field is more efficient at collecting light from a specific location than an optical interface with a long depth of field. This allows for imaging the best part of the plasma onto the entrance slit of the spectrometer.

Figure 4:
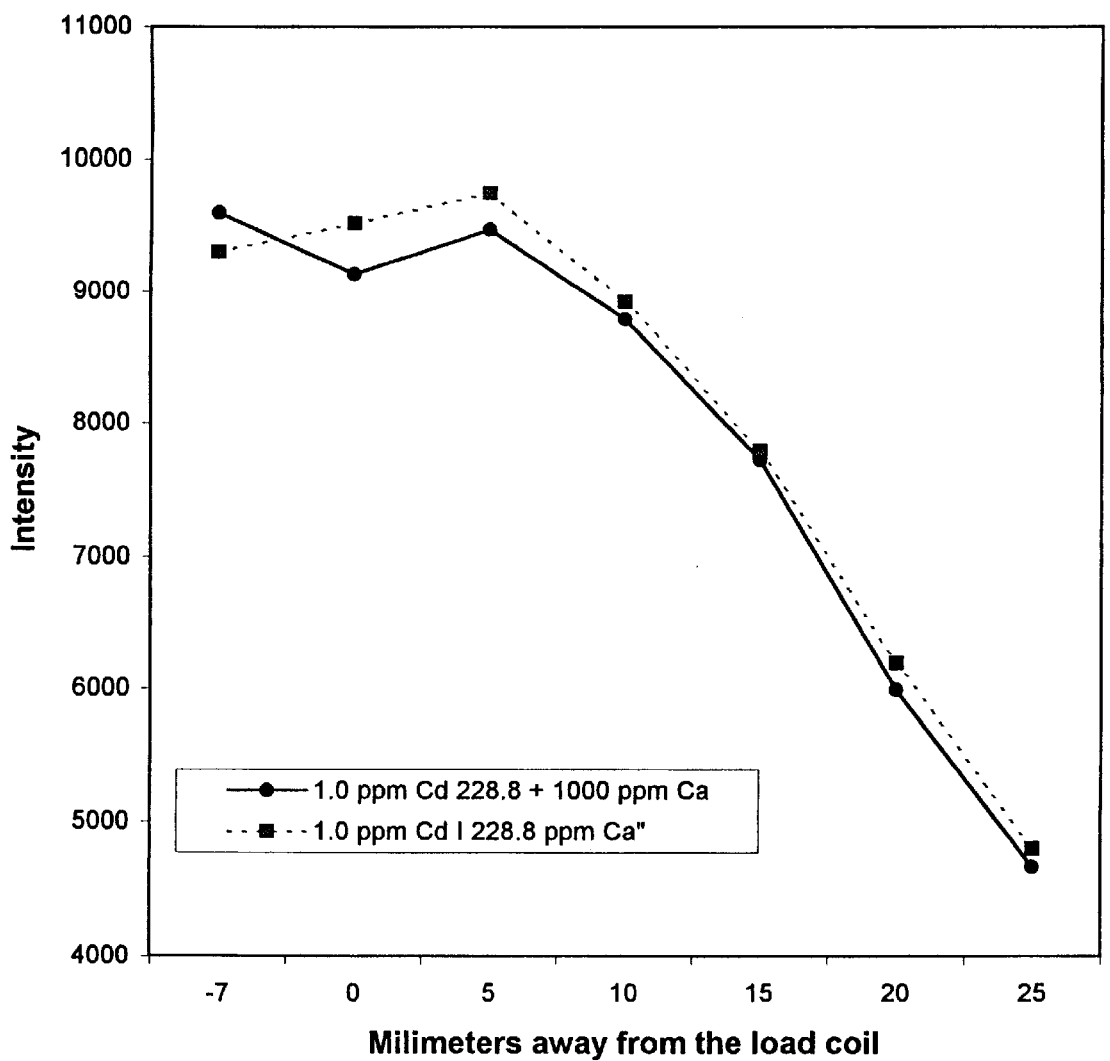
FIG. 4 shows that a graphic representation of a sample matrix, and its effect on the emission spectra of various analytes when using the current invention. Demonstrates the effect of a 1000 ppm Calcium matrix on atomic lines
Figure 5:
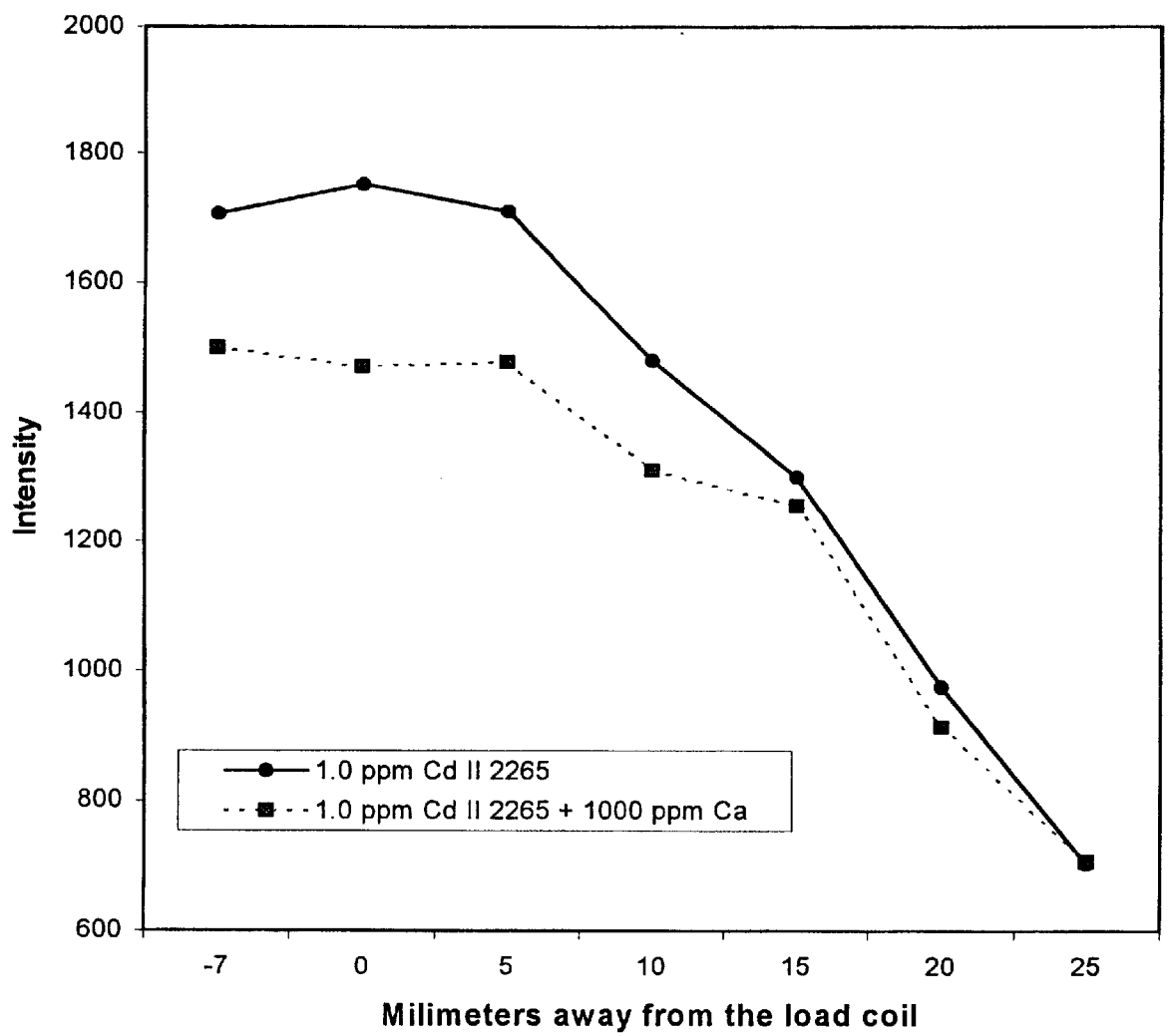
FIG. 5 shows the suppression effect that the sample matrix has on ionic emission spectra, with the current invention as compared to other optical configurations. Demonstrates the limited effect of a 1000 ppm Calcium matrix on ionic lines.

The study presented in FIG. 4 demonstrates that a 1000 ppm calcium matrix has little effect on the emission of atomic lines, even at 7 millimeters below the load coil. The study presented in FIG. 5 demonstrates that shows that the sample matrix has a large suppression on the emission of ionic lines. This effect is most pronounced at the load coil, where there is a 15% suppression of the signal. This suppression declines to about 3.5% at 15 millimeters away from the load coil. Therefore, it is best to have an optical interface that can selectively focus on the plasma a 15 millimeters away from the load coil. Notice that the signal intensity decreases as you image away from the load coil. This decrease is compensated for by the increased efficiency of the optical system at this location. (see also, FIG. 3).

This matrix effect may be caused by the higher energy requirement for excitation of ionic lines as compared to atomic lines. The high relative concentration of calcium in this study reduces the amount of available energy.
High-Efficiency Pneumatic Nebulizer The axially-viewed ICP-OES, though much more sensitive than a conventional radially-viewed ICP-OES, is prone to significant matrix effects. Matrix effects are the changes in the signal produced from a single element in water as compared with the signal produced in the presence of a concomitant species. Several explanations have been proposed for the production of the effect, including changes in electrical conductivity of the plasma, thermal conductivity of the plasma, ambipolar diffusion among others. These processes basically alter the energy transportation rate of the analyte from the toroidal hot zone of the plasma to the point at which it is sampled. Existing spectrometer optical configurations use a much longer depth of field to maximize detection limits. As a result the changes in energy transportation rates which give rise to matrix effects will always be observed, interfering with the resulting emission spectra. For example, calcium as a matrix constituent can strongly reduce the signal output of several trace elements. These suppressions are associated with the relatively high amount of energy required for the total ionization of the calcium in combination with its dissociation energy. Essentially calcium is siphoning away energy from trace elements through its own energies of dissociation and ionization.

The optical configuration disclosed herein combined with the use of a high-efficiency nebulizer is useful in reducing the observed matrix effects in an ICP-OES system. The high-efficiency nebulizer produces an aerosol in which the size of analyte droplets are almost entirely below 10 $\mu$m in size. (See Table 3). These droplets have an increased surface to mass ratio over larger droplets produced from conventional low-pressure nebulizers. This increased surface area allows for changes in the energy transport and energy absorbing processes (i.e., desolvation, dissociation, atomization, excitation, and ionization) to take place at the base of the plasma closer to the load coil, and away from the focal point of the optical interface. In contrast, larger droplets produced by low-pressure nebulizers will tend to migrate farther into the plasma channel and closer to the region focused upon by an optical arrangement, thus increasing observed matrix effects. Through the use of this nebulizer more emission intensity was produced per microgram of analyte entering the plasma, because the analyte transferring efficiency was enhanced relative to other nebulizers.

Responsivity

The amount of signal produced per microgram of analyte, which enters the plasma per second and imaged by the optical interface onto the entrance slit of the spectrometer, is termed the "responsivity" of the ICP-OES system. This measurement provides an understanding of the efficiency of conversion an analyte into a measurable emission from the spectrometer. The responsivity will be dependent on plasma excitation and ionization conditions, which are in turn affected by solvent loading. In the instant invention a greater state of excitation was seen due to the reduction and maintenance of relative drop diameters of analyte. This greater state of excitation due to reduced drop diameters and a more standardized aerosol reduce matrix effects, enhances the reliability of emission spectra.

Sensitivity

The sensitivity of a spectrometer is a measure of emission intensity per microgram of analyte in a given sample. This emission intensity in turn depends on the number of ionized particles that are in the observed plasma channel and the fraction of those that are excited and emit light of a characteristic wavelength. In the instant invention the high analyte transportation efficiency provides for a higher number of ionized particles to be excited. (Table 2). High analyte transport efficiency is due to the small average drop size of the generated analyte aerosol.

Essentially, a high-efficiency, pneumatic nebulizer will provide for an enhancement of sensitivity because with an enhanced control and reduction of the drop diameters of the primary aerosol the energies of desolvation, disassociation, and excitation are completed closer to the plasma base. That is, with a smaller drop diameter the amount of energy input needed is reduced per drop, allowing the aerosol to complete the needed processes of desolvation, disassociation, and excitation outside of the plasma to be sampled. When the energy requirement for these processes are lessened, these processes can take place closer to the plasma base so that any matrix effects occurring are out of focus and not imaged onto the entrance slit of the spectrometer. In this way a sample taken by a spectrometer's imaging optics can be made more stable and accurate. This more accurate measurement will then provide fewer matrix problems in the imaging process enhancing sensitivity and detection limits. (Table 3). With better detection limits and enhanced stability, low concentrations of analyte can be used reliably, thus providing an increased range of application possibilities including the use of smaller volumes of hazardous materials and the capability to retrieve results from extremely small sample volumes.

In addition, the invention disclosed herein, with the addition of a 6 mm photon stop behind the first optics lens has the capability to optically section the axis of the plasma with sufficient resolution such that it can be used to carry out studies on inductively coupled plasma itself. These studies could include the determination of electron number densities, analyte atom and ion number densities and generate analyte atom and ion emission profile maps.

Installation of the Retrofit Apparatus

Installation of the retrofit apparatus designed to convert a radially-viewed ICP-OES to an axial-viewed ICP-OES requires the removal of the existing optical interface for the radially-viewed spectrometer and replacing the existing load coil which is attached to the match box with a load coil that is re-oriented 90° degrees so that the plasma generated may be optically sectioned in an axial orientation. This may require extending the length of the load coal by 1 or 2 inches. Once the load coil is properly re-oriented the match box must be repositioned so that the load coil is in line with entrance slit of the spectrometer. Thereafter, the new optical interface is mounted. The optical interface includes those lenses or a combination of lenses and mirrors appropriate to properly sample the light radiation generated by the plasma emission spectrometer. The configuration of the optical interface, including the number and size of any included optical elements, may vary depending on the make and manufacture of the instrument. In addition, the torch should be remounted on a base that can be adjusted up and down, left and right. The apparatus so installed is also attached in fixed yet reversible manner.

Marketing research indicates that there are hundreds of old, radially-viewed plasma spectrometers that are still in service today, could benefit from this device. A new axially-viewed ICP-OES costs about $100,000, while the cost for a customer to upgrade his or her current radial viewed plasma would be a fraction of this capital outlay. Alternatively, the new optical configuration presented herein, along with the use of a high-efficiency pneumatic nebulizer would provide the basis for the production of an extremely sensitive ICP-OES with better detection limits and fewer matrix interferences than existing axial ICP-OES systems.

TABLE 1

| Col. A<br>Element Line<br>state wavelength | Col. B<br>Percent recovery of<br>1.0 ppm multi-element<br>standard in 1000 ppm Ca<br>TJA TRACE ICP with<br>H.P. Nebulizer and mod.<br>Cyclone spray chamber<br>(Long depth of field | Col. C<br>Percent recovery of<br>1.0 ppm multi-element<br>standard in 1000 ppm<br>Ca TJA Enviro 36 ICP<br>with axial conversion<br>optical interface with<br>H.P. Nebulizer and mod.<br>Cyclone spray chamber | Col. D<br>Percent recovery<br>of 1.0 ppm multi-<br>element standard in<br>1000 ppm Ca Perkin-<br>Elmer Axial Optima<br>Normal operating condi-<br>tions (Long depth of<br>field optical interface) | Col. E<br>Percent recovery of<br>1.0 ppm multi-element<br>standard in 1000 ppm<br>Ca TJA Enviro 36 ICP<br>with axial conversion<br>optical interface<br>with H.P. Nebulizer<br>and mod. Cyclone spray<br>chamber (Short depth of<br>field optical interface) | Col. F<br>Percent improvement<br>with the Axial<br>conversion optical<br>interface compared to<br>TJA-Trace & Optima |
|---|---|---|---|---|---|
| B I 2496 | 98.16 | 95.43 | 97.3 | 99.09 | 0.93–1.2 |
| Ba II 4934 | 102.30 | 100.40 | | 108.00 | |
| Cd II 2265 | 89.70 | 89.80 | 84.6 | 92.34 | 2.64–9.1 |
| Co II 2286 | 91.19 | 90.50 | 79.5 | 92.20 | 1.01–12.0 |
| Cr II 2667 | 89.45 | 89.23 | 72 | 92.75 | 3.3–13.0 |
| Cu I 3247 | 95.90 | 95.81 | 159 | 106.20 | |
| Fe II 2599 | 89.27 | 88.15 | | 94.77 | 5.5 |
| Mn II 2576 | 90.64 | 89.85 | 83.7 | 94.32 | 3.68–10.6 |
| Mo II 2020 | 94.65 | 94.92 | | 95.29 | 0.64 |
| Ni II 2316 | 88.52 | 87.47 | | 92.34 | 3.82 |
| P I 2149 | 101.20 | 100.50 | | 101.00 | Same |
| Pb II 2203 | 93.29 | 93.20 | 80.6 | 97.31 | 4.02–16.7 |
| V II 2924 | 92.09 | 92.73 | 90.5 | 95.86 | 3.77–5.36 |

The data of Table 1 shows that the optical system disclosed herein, using a short depth of field (S.D.F.) optical interface for viewing an axial ICP-OES system, can improve the recoveries of trace elements in a 1000 ppm $Ca^{+2}$ matrix when combined with a high pressure nebulizer and modified cyclone spray chamber (col. F). All other manufactures (TJA's-Trace Col. B & C and Perkin-Elmer's Optima Col. D) view the axis of an ICP-OES with a long depth of field (L.D.F.) optical interface systems. These types of optical interfaces image the entire length of the plasma equally, including the matrix prone regions, near the load coil, enhancing the matrix problems (Col. B & D). My optical interface focuses away from these matrix prone regions. The data also show that the use a high pressure nebulizer and modified cyclone spray chamber by themselves cannot correct the matrix problems of optical systems that use a L.D.F. optical interface (col. C).

The use of a high pressure nebulizer and modified cyclonic spray chamber is helpful in further reducing the matrix problems because this combination produces an aerosol with a low percentage of large droplets. Large droplets are capable of migrating into the area of the plasma where the optical system is focused, increasing the matrix problem.

The reported results for the elements listed in Col. A were those elements and wavelengths which were common for the three spectrometers.

TABLE 2

| Col. A<br>Element Line<br>state wavelength | Col. B<br>TJA TRACE ICP<br>Normal operating conditions<br>(Standard deviation of a blank in ppb<br>using 4 exposures of 5 seconds each)<br>(Long depth of field optical interface) | Col. C<br>TJA Enviro 36 ICP with axial<br>conversion optical interface with H.P.<br>Nebulizer and mod. Cyclone spray chamber<br>(Standard deviation of a blank in ppb<br>using 4 exposures of 5 seconds each)<br>(Short depth of field optical interface) |
|---|---|---|
| B I 2496 | 0.30 | 0.10 |
| BaII 4934 | 0.10 | 0.20 |
| Cd II 2265 | 0.12 | 0.20 |
| Co II 2286 | 0.20 | 0.30 |
| Cr II 2667 | 0.10 | 1.30 |
| Cu I 3247 | 0.30 | 0.40 |
| Fe II 2599 | 0.10 | 0.20 |
| Mn II 2576 | <0.10 | 0.10 |
| Mo II 2020 | 0.60 | 0.50 |
| Ni II 2316 | 0.40 | 0.50 |
| P I 2149 | 2.1 | 5.10 |
| Pb II 2203 | 0.30 | 1.90 |
| V II 2924 | 0.20 | 0.90 |

These data compare the sensitivity of an axial TJA-TRACE ICP-OES with that of a TJA radially viewed ICP-OES that was converted to an axial ICP-OES using my optical system. The sensitivity of the two instruments is about the same. This comparison is misleading because the components in the TRACE spectrometer are much better than the components in the ENVIRO 36 spectrometer. For example the TRACE uses a holographic grating, which produces less stray light than the ruled grating in the EVIRO 36. Also the TRACE uses narrower entrance and exit slits on a first order focal curve. The total improvement in the detection limits based on the newer components in the TRACE is at least a factor of two.

TABLE 3

| Col. A<br>Element line<br>state wavelength | Col. B<br>Percent recovery of 1.0 ppm multi-element standard in 1000 ppm Ca TJA TRACE ICP Normal Nebulizer normal cyclone spray chamber (uses a long depth of field optical interface) | Col. C<br>Percent recovery of 1.0 ppm multi-element standard in 1000 ppm Ca TJA Enviro 36 ICP Normal Nebulizer normal cyclone spray chamber (switching to a long depth of field optical interface) | Col. D<br>Percent recovery of 1.0 ppm multi-element standard in 1000 ppm Ca TJA Enviro 36 ICP high pressure Nebulizer modified cyclone spray chamber (switching to a long depth of field optical interface) | Col. E<br>Percent recovery of 1.0 ppm multi-element standard in 1000 ppm Ca TJA Enviro 36 ICP with axial conversion optical interface with H.P. Nebulizer and mod. Cyclone spray chamber (uses a short depth of field optical interface) |
|---|---|---|---|---|
| B I 2496   | 98.16  | 97.10  | 97.78  | 99.09  |
| Ba II 4934 | 102.30 | 108.00 | 108.80 | 108.00 |
| Cd II 2265 | 89.70  | 88.33  | 87.98  | 92.34  |
| Co II 2286 | 91.19  | 86.87  | 87.56  | 92.20  |
| Cr II 2667 | 89.45  | 91.31  | 90.27  | 92.75  |
| Cu I 3247  | 95.90  | 105.70 | 107.00 | 106.20 |
| Fe II 2599 | 89.27  | 89.76  | 90.06  | 94.77  |
| Mn II 2576 | 90.64  | 90.43  | 90.66  | 94.32  |
| Mo II 2020 | 94.65  | 95.29  | 95.08  | 95.29  |
| Ni II 2316 | 88.52  | 85.35  | 85.99  | 92.34  |
| P I 2149   | 101.20 | 101.70 | 104.50 | 101.00 |
| Pb II 2203 | 93.29  | 90.62  | 92.24  | 97.31  |
| V II 2924  | 92.09  | 94.11  | 93.44  | 95.86  |

These data show that the percentage recovery of trace elements in a 1000 ppm Ca is independent of the instrument used. When a short depth of field optical interface for a long depth of field optical interface the percentage recovery is about the same (col. C) as that of a new TJA TRACE (col. B). These data also show that the use a high pressure nebulizer and modified cyclone spray chamber by themselves can not correct the matrix problems of optical systems that use a L.D.F. optical interface (col. D).

Literature Cited and Incorporated by Reference

1. M. W. Blades and G. Horlick, 1980 ICP 5 *Photodiode Array Measurement System for Implementing Abel Inversions on Emission From an Inductively Coupled Plasma*, Appl. Spectrosc., 34, No. 6 pp: 696–699.
2. M. W. Blades and G. Horlik, 1981 ICP3 *The Vertical Spatial Characteristics of Analyte Emission in the Inductively Coupled Plasma*, Spectrochim. Acta, 3611, No. 9 pp: 861–880.
3. M. W. Blades and G. Horlick, 1981 ICP 4 *Interference From Easily Ionizable Element Matrices in Inductively Coupled Plasma Emission Spectrometry—A Spatial Study*, Spectrochimica Acta., 36B, No 9 pp: 881–900.
4. M. W. Blades and C. B. L., 1985 ICP18 *Exitation Temperature and Electron Density m the Inductively Coupled Plasma-Aqueous vs. Organic Solvent Introduction*, Spectrochim. Acta., 40B, No 4 pp: 579–591.
5. P. W. J. M. Bournans, 1982 ICP 29 *Comment on a Proposed Excitation Mechanism in Argon ICPs*, Spectrochim. Acta., 3711 pp: 75–82.
6. B. L. Caughlin and B. M. W., 1984 ICP 36, *An evaluation of Ion-Atom Emission Intensity Ratios and Local Thermodynamic equilibrium in an Inductively Coupled Plasma*, Spectrochim. Acta., 39, No. 12 pp: 1583–1602.
7. B. L. Caughlin and M. W. Blades, 1985 ICP 37 *Analyte Ionization in the Inductively Coupled Plasma*, Spectrochim. Acta., 40B, 10–12 pp: 1539–1554.
8. T. J. Cleland and F. R. Meeks, 1996 *Statistical Mechanics of $Ar^{+2}$ in an Inductively Coupled Plasma*. Spectrochim. Acta., 51B, pp: 1487–1490.
9. J. Davies and R. D. Snook, 1986 ICP 24 *Spatial Emission Characteristics and Excition Mechanisms in the Inductively Coupled Plasma*, J. Anal. At. Spectrom., 1, October pp: 325–330.
10. J. Davies, J. R. Dean and R. D. Snook, 1985 ICP 17 *Axial View Of an Inductively Coupled Plasma*, Analyst, 110, May pp: 535–540.
11. D. R. Demers, 1979 ICP 6, *Evaluation of the Axially Viewed (End-On) Inductively Coupled Argon Plasma Source for Atomic Emission Spectroscopy*, Appl. Spectrosc., 33, No. 6 pp: 584–591.
12. C. Dubuisson, E. Poussel and L. M. Mermet, 1997 ICP 31 *Comparison of Axially and Radially Viewed Inductively Coupled Plasma Atomic Emission Spectrometry in Terms of Signal-to-Background Ratio and Matrix Effects*, J. Anal. At. Spectrom., 12, March pp: 281–286.
13. L. M. Faires, T. M. Bieniewski, C. T. Apel and T. M. Niemczyk, 1985 ICP 14 *"Top-Down" Versus "Side-On" Viewing of the Inductively Coupled Plasma*, Appl. Spectrosc., 39, No 1 pp: 5–9.
14. N. Furuta and C. Horlick, 1982 ICP 11 *Spatial Characterization of Analyte Emission and Excitation Temperature in an Inductively Coupled Plasma*, Spectrochim. Acta., 37B, No. 1 pp: 53–64.
15. P. J. Galley and C. M. Hieftje, 1994 ICP 19 *Easily Ionizable Element (EIE) Interferences in Inductively Coupled Plasma Atomic Emission Spectrometry-II. Minimization of EIE Effects By Choice of Observation Volume*, Spectrochim. Acta., 49B, No 7 pp: 703–724.
16. W. H. Gunter, K. Visser and Z. P. B., 1982 ICP 16 *Some Aspects of Matrix Interference Caused by elements of Low Ionization Potential in Inductively Coupled Plasma Atomic Emission Spectrometry*, Spectrochim. Acta., 3713, No 7 pp: 571–581.
17. T. Hasegawa and H. Haraguchi, 1985 ICP 35 *A Collisional-Radiative Model Including Radiation Trapping and Transport Phenomena for Diagnostics of an Inductively Coupled Argon Plasma*, Spectrochim. Acta., 40B, 10–12 pp: 1505–1515.
18. G. M. Hiefte, G. D. Rayson and J. W. Olesik, 1985 ICP 10, *A Steady-State Aproach to Exitation Mechanism in the ICP*, Spectrochim. Acta., 40B, Nos. 1/2 pp: 167–176.
19. G. M. Hiefte, 1996 ICP 22 *The Future of Plasma Spectrochemical Instrumentation*, J. Anal. At. Spectrom., 11, September pp: 613–621.
20. G. Horlick and N. Foruta, 1982 ICP 8 *Spectrographic Observation of the Emission Structure of the Inductively Coupled Plasma*, Spectrochimica Acta., 37B, No. 11 pp: 999–1008.

21. M. Huang and L. Keling, 1986 ICP 1 Decay of an Inductively Coupled Argon Plasma Above the Load Coil, J. Anal. At. Spectrom., 1, April pp: 153 to 156.
22. J. C. Ivaldi and T. J. F., 1995 ICP 40 Real-Time Internal Standardization with an Axially-Viewed Inductively Coupled Plasma for Optical Emission Spectrometry, Spectrochim. Acta., 51B, pp: 1443–1450.
23. E. B. M. Jansen and D. R. Demers, 1985 ICP 33 Hollow-Cathode Lamp-Excited Inductively Coupled Plasma Atomic-Fluorescence Spectrometry: Performance Under Compromise Conditions For Simultaneous Multi-Element Analysis, Analyst, 110, May pp: 541–545.
24. T. C. Johnston, R. S. Perry, L. J. Fick and H. B. Fannin, 1997 ICP 32 An Examination of Relative Trends of Atomic Defection Limits in the Inductively Coupled Plasma, Spectrochim. Acta., B 52, pp: 125–129.
25. B. R. LaFreniere, D. R. Wiederin, V. A. Fassel and R. S. Houk, 1996 ICP 13 Molecular Hydrogen Emission in the Vacuum Ultraviolet From an Inductively Coupled Plasma, Spectrochimica Acta, 51B, pp: 3–12.
26. G. F. Larson, V. A. Fassel, R. H. Scott and R. N. Kniseley, 1975 ICP 9 Inductively Coupled Plasma—Optical Emission Analytical Spectrometry: A Study of Some Inter-element Effects, Anal. Chem., 47, No. 2 pp: 238–243.
27. J. M. Mermet and E. Poussel, 1995 ICP 21 ICP Emission Spectrometers: 1995 Analytical Figures of Merit, Appl. Spectrosc., 49, Number 10 pp: 12a–18a.
28. G. P. Miller, 1991 ICP 39 A Method for Observing Changes in Radiative Losses From an Inductively Coupled Argon Plasma, Spectrochim. Acta., 4613, No 9 pp: 1253–1262.
29. A. Montaser and V. A. Fassel, 1982 ICP 7 Atomic Emission Spectrometry With a Skimmed Inductively Coupled AR Plasma, Appl. Spectrosc., 36,No. 4 pp: 454–459.
30. J. Mostaghimi, P. Proulx and M. I. Boulos, 1985 ICP 12 Computer Modeling of the Emission Patterns for a Spectrochemical ICP, Spectrochim. Acta., 40B, Nos. 1/2 pp: 153–166.
31. Novonty, J. C. Farinas, W. Jia-ling, E. Poussel and J. M. Mermet, 1996 ICP 34 Effect of Power and Carrier Gas Flow Rate on the Tolerance to Water Loading in Inductively Coupled Plasma Atomic Emission Spectrometry, Spectrochim. Acta., 51B, pp: 1517–1526.
32. K. O'Hanlon, L. Ebdon and M. Foulkes, 1997 ICP 26 Effect of Easily Ionisable Elements on the Mass Transport of Solutions and Slurries Used in Plasma Emission Spectrometry, J. Anal. At. Spectrom., 12, March pp: 329–331.
33. J. W. Olesik, J. A. Kinzer and B. Harkleroad, 1994 ICP 38 Inductively Coupled Plasma Optical Emission Spectrometry Using Nebulizers with Widely Different Sample Consumption Rates, Anal. Chem., 66, No. 13, July 1 pp: 2022–2030.
34. L. Paama, L. Piiri, P. Peramaki and L. H. Lajunen, 1995 ICP 20 Matrix Effects in Argon Plasma on Elemental Analysis of Archaeological Glazes by Inductively Coupled Plasma Atomic Emission Spectrometry, J. of Anal. Atom. Spectrom., 10, Feb. pp: 117–19.
35. M. H. Ramsey and M. Thompson, 1986 ICP 2 A Predictive Model of Plasma Matrix Effects in Inductively Coupled Plasma Atomic Emission Spectrometry, J. Anal. At. Spectrom., 1, June, pp. 185–193.
36. D. C. Schram, J. A. M. Vandermullen, J. M. Deregt, D. A. Benoy, F. H. A. G. Fey, F. De Grootte and J. Jonkers, 1996 ICP 23 Fundamental Description of Spectrochemical Inductively Coupled Plasmas, Appl. Spectrosc., 11, pp: 623–632.
37. N. N. Sesi and G. M. Hieftje, 1996 ICP 25 Studies into the Inter-element Matrix Effect in Inductively Coupled Plasma Spectrometry, Spectrochim. Acta., 51B, pp: 1601–1628.
38. M. Thompson and M. H. Ramsey, 1985 ICP 15 Matrix Effects Due to Calcium in Inductively Coupled Plasma Atomic-Emissio Spectrometry: Their Nature, Source and Remedy, Analyst, 110, Dec. pp: 1413–1422.
39. M. Thompson, M. H. Ramsey, B. J. Coles and C. M. Du, 1987 ICP 27 Correction of Matrix Effects in Inductively Coupled Plasma Atomic Emission Spectrometry by Interactive Power Adjustment, J. Anal. At. Spectrom., 2, March pp: 185–188.
40. M. Thompson and M. H. Ramsey, 1987 ICP 28 Self-matrix Effects as a Cause of Calibration in Inductively Coupled Plasma Atomic Emission Spectrometry, J. Anal. At. Spectrom., 2, February pp: 33–38.
41. D. G. J. Weir and M. W. Blades, 1994 ICP 30 The Response of the Inductively Coupled Argon Plasma to Solvent Plasma Load: Spatially Resolved Maps of Electron Density Obtained from the Intensity of One Argon Line, Spectrochim. Acta., 49B, 1214 pp: 1231–1250.

Accordingly, it is to be understood that the embodiments of the invention herein described are merely illustrative of the application of the principles of the invention. References herein to details of the illustrated embodiments are not intended to limit the scope of the claims, which themselves recite those features regarded as essential to the invention.

What is claimed is:

1. A plasma emission spectrometer comprising:
   a) a plasma generator for creating a plasma having a central plasma channel with a longitudinal axis;
   b) detector means for detecting light radiation relative to spectral wavelength said detector means having an entrance aperture;
   c) an optical interface for sampling light radiation comprising at least a first optics element aligned with the longitudinal axis of the central plasma channel and a second optics element arranged cooperatively with said plasma generator and said detector means, the first optics element being located close to the plasma such that light radiation generated along the longitudinal axis of the central plasma channel is imaged by said first optics element and sampled by said optical interface, and directed into said detector means by said optical interface;
   d) means for introducing an analyte into said plasma created by said plasma generator; and
   e) a cooled skimmer placed between said first optics element and the plasma generated by said plasma generator,
   wherein said first optics element is a collimating lens and said second optics element is a focussing lens.

2. The plasma emission spectrometer of claim 1 wherein said first and said second optics elements are lenses capable of refracting light radiation in the range of infrared, visible and ultraviolet light.

3. The plasma emission spectrometer of claim 2 wherein said first and said second optics elements are composed of materials selected from the group consisting essentially of:
   a) glass;
   b) calcium fluoride;
   c) magnesium fluoride;
   d) sapphire; and
   e) material capable of refracting the electromagnetic radiation in the range of infrared, visible and ultraviolet light generated by said plasma emission spectrometer.

4. The plasma emission spectrometer of claim 2 wherein said first optics element is a 50–75 millimeter collimating lens and said second optics element is a 250 millimeter focusing lens.

5. The plasma emission spectrometer of claim 1 wherein said means for introducing an analyte into said plasma created by said plasma generator is selected from the group consisting of:
 a) a high-efficiency nebulizer;
 b) a ultrasonic nebulizer;
 c) a nebulizer;
 d) electothermal vaporization; and
 e) laser ablation.

6. The plasma emission spectrometer of claim 2 in which said first optics element is within 2–10 centimeters of the plasma generated by said inductively coupled plasma generator, in alignment with the longitudinal axis of said plasma.

7. The plasma emission spectrometer of claim 2 further comprising a photon stop located between said first optical element and said second optical element.

8. The plasma emission spectrometer of claim 1 wherein the light radiation generated by said plasma generator and sampled by said optical interface is subject to user controlled adjustment.

9. The plasma emission spectrometer of claim 1 wherein said optical interface used to sample the light radiation generated by said plasma generator is subject to user controlled adjustment.

10. The plasma emission spectrometer of claim 1 wherein said plasma generator has at least one induction coil.

11. The plasma emission spectrometer of claim 1 wherein said plasma generator has at least two interlaced induction coils.

12. The plasma emission spectrometer of claim 1 further comprising an outer protective layer between said skimmer and plasma created by said plasma generator, said outer protective layer being covered by a layer of heat resistant material.

13. The plasma emission spectrometer of claim 12 wherein said cooled skimmer has a fluid coolant drawn through it from a coolant source such that said cooled skimmer is cooled so as to draw heat away from said outer protective layer.

14. The plasma emission spectrometer of claim 13 wherein said cooled skimmer is housed in a cylindrical tube, said tube being covered by a material selected from the group consisting essentially of:
 a) poly-tetrafluorethylene; and
 b) a material with a high resistance to heat.

15. The plasma emission spectrometer of claim 12 wherein said outer protective layer is a material selected from the group consisting essentially of:
 a) nickel;
 b) titanium;
 c) chromium;
 d) platinum;
 e) fused quartz;
 f) magnesium silicate;
 g) manganese; and
 h) a material or alloy with a high melting point and is capable of efficient heat transfer.

16. The plasma emission spectrometer of claim 1 further comprising a cylindrical tube housing said cooled skimmer, can be differentially exhausted to vent away hot gasses generated by said plasma generator.

17. The plasma emission spectrometer of claim 1 further comprising a continuous directed movement of a gas over at least said first optics element, such that said gas cools at least said first optics element.

18. The plasma emission spectrometer of claim 17 wherein said gas is selected from the group consisting essentially of:
 a) argon gas;
 b) nitrogen gas;
 c) air; and
 d) an inert gas.

19. An apparatus for converting a radially-viewed plasma optical emission spectrometer into an axially-viewed plasma optical emission spectrometer, said radially-viewed plasma optical emission spectrometer containing a plasma generator, the apparatus comprising:
 a) an optical interface contained in said apparatus for sampling light radiation comprised of at least a first and a second optics element arranged cooperatively with said plasma generator and said detector means such that light radiation generated from said plasma generator and sampled by said optical interface is directed into said detector means by said optical interface;
 b) detector means with an entrance aperture for detecting the light radiation relative to spectral wavelength contained in said apparatus;
 c) a cooled skimmer placed between said first optics element and plasma generated by said optical emission spectrometer contained in said apparatus;
 d) means to attach said apparatus to said radially-viewed plasma optical emission spectrometer; and
 e) means to change the orientation of the plasma generated by said plasma generator relative to said conventional radially-viewed spectrometer, such that the radiation sampled by said optical interface is axial radiation emitted from the plasma generator.

20. The apparatus of claim 19 wherein said first and said second optics elements are lenses capable of refracting light radiation.

21. The apparatus of claim 20 wherein said first optics element is a collimating lens and said second optics element is a focusing lens.

22. The apparatus of claim 20 wherein said first and said second optics elements are composed of materials selected from the group consisting essentially of:
 a) glass;
 b) calcium fluoride;
 c) magnesium fluoride;
 d) sapphire; and
 f) material capable of refracting the electromagnetic radiation in the range of infrared, visible and ultraviolet light generated by said plasma emission spectrometer.

23. The apparatus of claim 21 wherein said first optics element is a 50-millimeter plano-convex collimating lens and said second optics element is a 250-millimeter plano-convex focusing lens.

24. The apparatus of claim 21 wherein said first optics element is a 75-mm focusing lens and said second optics element is a 250-mm focusing lens.

25. The apparatus of claim 21 further comprising a means to place said first optics element within 2–10 centimeters of the plasma generated by said plasma generator in alignment with the longitudinal axis of plasma generated by said plasma emission spectrometer.

26. The apparatus of claim 21 further comprising a photon stop placed between said first optics element and said second optics element.

27. The apparatus of claim 19 wherein the light radiation generated by said plasma generator and sampled by said optical interface is subject to user controlled adjustment.

28. The apparatus of claim 19 wherein said optical interface used to sample the light radiation generated by said plasma generator is subject to user controlled adjustment.

29. The apparatus of claim 19 wherein said cooled skimmer is further comprised by an inner cooled channel surrounded by an outer protective layer, said outer protective layer being covered by a layer of heat resistant material.

30. The apparatus of claim 19 wherein said cooled tube has a coolant drawn through it from a coolant source such that said skimmer is cooled so as to draw heat away from said cooled skimmer.

31. The apparatus of claim 29 wherein said cooled skimmer is housed in a cylindrical tube.

32. The apparatus of claim 31, wherein said cylindrical tube is covered by a material selected from the group consisting essentially of:
 a) poly-tetrafluorethylene; and
 b) a material with a high resistance to heat.

33. The apparatus of claim 29 wherein said outer protective layer is covered by a material selected from the group consisting essentially of:
 a) nickel;
 b) titanium;
 c) chromium;
 d) platinum;
 e) fused quartz;
 g) magnesium silicate;
 h) manganese; and
 i) a material or alloy with a high melting point and is capable of efficient heat transfer.

34. The apparatus of claim 19 wherein said optical interface is further comprised by the continuous directed movement of a gas over at least said first optics element, such that said gas cools at least said first optics element.

35. The apparatus of claim 34 wherein said gas is selected from the group consisting essentially of:
 a) argon gas;
 b) nitrogen gas;
 c) air; and
 d) an inert gas.

36. The apparatus of claim 19 wherein said means capable of introducing an analyte into a plasma created by said plasma generator is selected from the group consisting of:
 a) a high-efficiency nebulizer;
 b) a ultrasonic nebulizer;
 c) a nebulizer;
 d) electothermal vaporization; and
 e) laser ablation.

37. The apparatus of claim 19 wherein said apparatus can be attached to an optical emission spectrometer.

38. A method of reducing matrix effects seen in plasma emission spectrometers comprising:
 a) employing an optical interface for sampling axial light radiation comprised of at least a collimating lens and a focussing lens;
 b) arranging said optical interface so that it can function cooperatively with a plasma generator, a detector means, and a plasma field;
 b) arranging said optical interface so that it can function cooperatively with a plasma generator, a detector means, and a plasma field;
 c) placing a cooled skimmer between said first optics element and plasma generated by said plasma generator;
 d) placing said first optics element within 2 to 10 centimeters of the plasma generated by said plasma generator; and
 wherein said optical interface, detector means, and a plasma field are arranged such that light radiation generated along the longitudinal axis of said plasma and sampled by said optical interface is directed into said detector means by said optical interface.

39. The method of claim 38 further comprising; placing a photon stop at least 4 millimeters behind said first optics element.

* * * * *